April 7, 1959 W. ALVAREZ ET AL 2,880,797
FRAMELESS WINDOW SCREEN
Filed Sept. 7, 1954 2 Sheets-Sheet 1
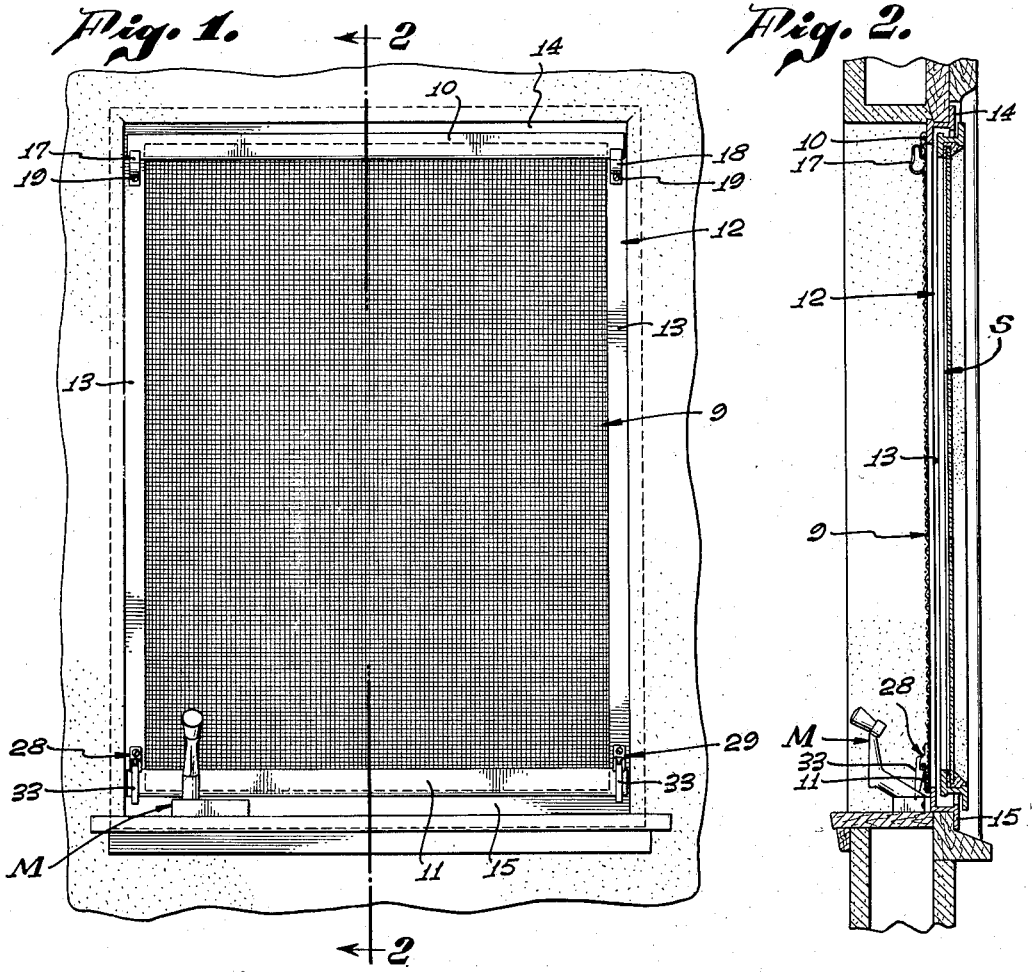
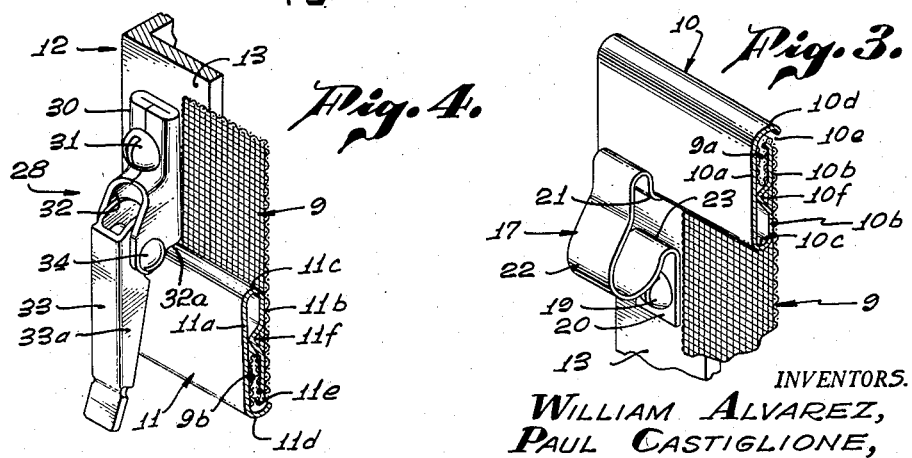
INVENTORS.
WILLIAM ALVAREZ,
PAUL CASTIGLIONE,
By Paul A. Weilein
ATTORNEY.

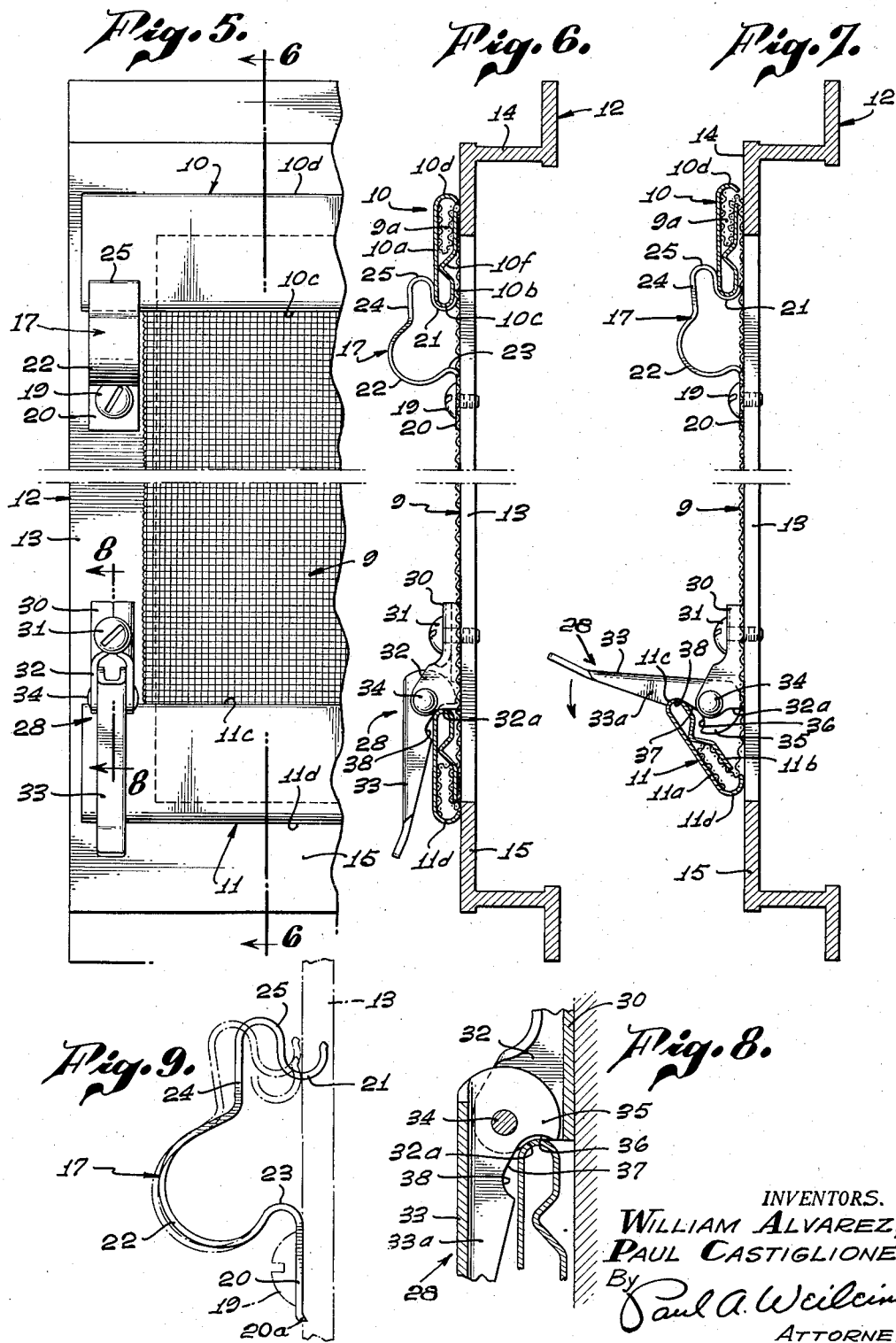

United States Patent Office 2,880,797
Patented Apr. 7, 1959

2,880,797

FRAMELESS WINDOW SCREEN

William Alvarez, Glendale, and Paul Castiglione, Los Angeles, Calif., assignors to The Columbia Mills, Inc., Syracuse, N.Y., a corporation of New York Application September 7, 1954, Serial No. 454,340

2 Claims. (Cl. 160—328)

This invention relates to frameless window screens.

It is an object of this invention to provide, a frameless window screen which is an improvement over known screens of this class, in point of ease of installation, reliability of performance and simplicity and inexpensiveness of construction.

Another object of this invention is to provide improved interrelated hardware for mounting frameless window screens in window frames.

Further, it is an object hereof to provide novel means for supporting a frameless screen in tensioned engagement with a window frame.

An additional object hereof is to provide novel spring brackets of simple construction for yieldably supporting the ends of a rail fastened to the top of the screen, with said rail resiliently held against the window frame and subject to yielding downwardly while thus held.

Further, it is an object to provide a novel holddown means adapted to be mounted on the lower portion of the window frame for engaging and moving a bottom rail on the lower edge of the screen into a position, whereby the supporting brackets and the hold-down means cooperate to hold the screen in close tensioned engagement with the window frame.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is an elevational view of a window in which is mounted a frameless screen embodying the present invention;

Fig. 2 is a vertical sectional view taken on the line 2—2 of Fig. 1;

Fig. 3 is an enlarged fragmentary perspective view, partly in section, of an upper corner of the screen showing the manner in which one of the spring brackets is employed to support the screen;

Fig. 4 is an enlarged fragmentary perspective view partly in section of a lower corner of the screen showing the manner in which one of the hold-down units holds the screen in place;

Fig. 5 is an enlarged fragmentary elevational view of the window and screen shown in Fig. 1;

Fig. 6 is a vertical sectional view taken on the line 6—6 of Fig. 5;

Fig. 7 is a sectional view similar to Fig. 6 showing the hold-down means in position for releasing the screen;

Fig. 8 is an enlarged sectional view taken on the line 8—8 of Fig. 5; and

Fig. 9 is a schematic elevational view of one of the spring brackets showing the manner in which it is tensioned against the window frame.

One embodiment of this invention, as shown in the accompanying drawings, includes a strip or sheet 9 of screen material detachably secured at its upper and lower transverse edges to top and bottom rails 10 and 11 respectively.

The screen 9 and the top and bottom rails 10 and 11 as here shown are dimensioned to be mounted on the inside of a window frame 12 for example, of an outwardly opening sash S operated by the usual mechanism M. The margins of the screen 9 overlie the vertical side members 13, the top member 14 and the sill or bottom member 15, respectively, of the window frame. The rails 10 and 11 are held against the top and bottom members 14 and 15 of the window frame. The ends of the rails extend beyond the side edges of the screen and engage the side members 13 of the window frame.

The top rail 10 is in the form of a somewhat flattened tube, being formed of sheet metal bent to define opposed side walls 10a and 10b joined by means of a rounded portion 10c along one edge of the rail. A similar rounded portion 10d is formed on the side wall 10a along the other edge of the rail. The free edge of the rounded portion 10d is spaced from the adjacent edge of the side wall 10b to form a longitudinal slot or opening 10e extending from end to end of the rail. The side wall 10b is longitudinally indented to form a reinforcing rib 10f between the side walls. A rebent hook-like edge portion 9a formed on the upper edge of the screen 9, is inserted endwise into the slot 10e for fastening the screen to the top rail 10. The top rail 10 and screen are connected in this manner so that the screen extends downwardly from the upper edge of the side wall 10b. The free edge portion of the rounded portion 10d may be struck inwardly at spaced points to engage the screen and prevent sliding thereof in the slot 10e.

The bottom rail 11 is identical in construction to the top rail 10, having side walls 11a and 11b, rounded portions 11c and 11d, slot 11e, and a rib 11f. However, in use, this bottom rail 11 is inverted so that the slot 11e is adjacent the lower edge of the rail whereby the rebent hook edge 9b of the screen is fastened adjacent the lower edge of the rail, as shown in Figs. 4 and 7.

With this arrangement it will be seen that the screen 9 depends from adjacent the upper edge of the top rail 10 to the point of its connection with the lower portion of the bottom rail 11 whereby the mounting of the screen is facilitated, as will be hereinafter described.

In accordance with this invention the top and bottom rails 10 and 11 mounted as here shown on the screen, together with bracket means and hold down means which will now be described, constitute correlated and interdependent hardware, making it possible quickly, easily and inexpensively to install frameless screening in window frames.

The bracket means referred to is employed to hold the upper edge of the screen in place. It serves the triple purpose of supporting the top rail, resiliently urging the rail into close engagement with the top member 14 of the window frame and of yielding downwardly and holding the screen under tension against the window frame incident to the fastening of the lower edge of the screen in place. Accordingly, the bracket means as here shown comprises a pair of leaf spring brackets 17 and 18 which are identical, each being adapted to be secured by means of a single fastening 19 to the side members 13 of the window frame.

Each of the brackets 17 and 18 includes a single leaf spring having an apertured end portion 20 through which the fastening 19 is inserted to secure the bracket in place. The other end portion of each bracket is free and formed as a U-shaped seat portion 21 for reception of the lower rounded edge of the top rail 10. Between the end portions 20 and 21, each bracket is formed with a large outwardly bowed loop portion 22. The lower end of the loop portion 22 is joined to the end portion 20 by a curved portion 23. The upper end of the loop portion 22 terminates in a straight portion 24 and a curved portion 25 which form with one side of the U-shaped seat 21, an inverted U. This construction of the brackets provides a strong spring supporting means for securely but yieldably mounting the top rail 10, while at the same time urging this rail laterally to maintain it in close engagement with the top member 14 of the window frame.

Fig. 9 shows how each bracket is tensioned so that when fixed on the window frame it will urge the U-shaped seat 21 against the associated side member 13 of the window frame. Each bracket is sprung outwardly to substantially the dot-dash position shown in Fig. 9, in order to seat the top rail in the U-shaped seat portion 21. Each bracket has a spur 20a on the apertured end portion 20 thereof for engaging the window frame so as to prevent rotative movement of the bracket about the fastening 19.

The hold-down means comprises a pair of clamping devices 28 and 29 adapted to be mounted on the side members 13 of the window frame adjacent the bottom member or sill 15. Each of these devices includes a bracket 30 adapted to be fastened to a side member 13 by means of a single screw fastening 31. A bifurcated portion 32 of the bracket provides for mounting a lever 33 therebetween on a pivot pin 34. The lever 33 is constructed to releasably engage the top edge of the bottom rail 11 for moving this rail downwardly beneath the associated bracket 30 for tensioning the screen so that the side edges thereof will be held in tight overlapping engagement with the window frame.

Each lever 33 is channel-shaped and the inner ends of the opposed sides 33a thereof are enlarged and extend beyond the pivot pin 34 to form a hook portion 35. This hook portion provides rounded shoulders 36 which merge with cam surfaces 37 formed by notches 38 in the sides 33a of the lever 33.

When the levers 33 of the clamping members 28 and 29 are positioned as shown in Fig. 7, the upper rounded edge of the bottom rail 11 is engageable in the notches 38. Upon now swinging the levers 33 downwardly, the cam surfaces 37 cooperate with the rounded upper edge of the botom rail 11 to move this rail inwardly against the side members 13 of the window frame and downwardly into overlapping engagement with the sill 15, to occupy the position shown in Fig. 6.

When the levers 33 move the bottom rail downwardly, the spring brackets 17 and 18 yield and the screen 9 is tensioned so that the edges thereof are brought into close overlapping engagement with the side members 13 of the window frame.

The brackets 30 on which the levers 33 are pivoted, are formed to hold the bottom rail in a position causing the side edges of the screen to be tensioned into tight engagement with the side member 13 of the window frame. Accordingly, the lower edges 32a of the bifurcated portion 32 of the brackets 30 are somewhat hook shaped and rounded whereby the rounded upper edge of the rail 11, when moved beneath the brackets 30 to occupy the position shown in Fig. 6, will be held down by the edges 32a.

The cam surfaces 37 and the shoulders 36 on the levers 33 in engaging the top edges of the bottom rail 11 when swinging the levers 33 downwardly, will force the bottom rail beneath the hook-like edges 32a on the brackets 30. As the spring brackets 17 and 18 and the screen are tensioned by the downward movement of the bottom rail 11, it is apparent that the rail will be resiliently held against the edges 32a of the brackets which therefore prevent dislodgement of the bottom rail from the screen-clamping position shown in Fig. 6.

It will be apparent that the spring brackets 17 and 18 and the clamping devices 28 and 29 cooperate to securely but releasably hold the screen in place in a particularly efficacious manner.

The screen is released by swinging the levers 33 upwardly, the shoulders 36 then moving the rail 11 downwardly and outwardly from beneath the edges 32a on the brackets 30, to the position shown in Fig. 7. The screen may now be removed by lifting the top rail 10 from the spring brackets 17 and 18.

We claim:

1. A clamp for releasably holding the bottom rail of a suspended screen in a position tensioning the screen, including: a bracket adapted to be fixed to a support; said bracket having a shoulder; a lever fulcrumed on the bracket; said lever having a notch between its ends providing a cam surface for engaging and moving said rail beneath and against said shoulder responsive to movement of said lever in one direction; and means on said lever for engaging and moving said rail downwardly and outwardly from engagement with said shoulder responsive to movement of said lever in the opposite direction.

2. A clamp for releasably holding the bottom rail of a suspended screen in a position tensioning the screen, including: a bracket adapted to be fixed to a support; said bracket having a shoulder for engaging said rail; a lever fulcrumed between its ends on said bracket; said lever having a notch forming a cam surface on one side of said fulcrum for engaging and moving said rail into engagement with said shoulder responsive to movement of said lever in one direction, and a portion at one end of said lever providing a curved surface merging with said cam surface for engaging and moving said rail downwardly and outwardly from engagement with said shoulder responsive to movement of said lever in the opposite direction.

References Cited in the file of this patent

UNITED STATES PATENTS

| 337,862 | Perry | Mar. 16, 1886 |
|---|---|---|
| 1,624,534 | Chewning | Apr. 12, 1927 |
| 2,035,828 | Nye et al. | Mar. 31, 1936 |
| 2,525,149 | Rust et al. | Oct. 10, 1950 |
| 2,554,542 | Rust et al. | May 29, 1951 |
| 2,587,853 | Jensen et al. | Mar. 4, 1952 |
| 2,661,098 | Wannop | Dec. 1, 1953 |
| 2,705,997 | Lang | Apr. 12, 1955 |
| 2,751,001 | Lang | June 19, 1956 |

FOREIGN PATENTS

| 16,369 | Great Britain | Dec. 14, 1886 |